Patented May 31, 1949

2,471,831

UNITED STATES PATENT OFFICE 2,471,831

BROMINE TRIFLUORIDE TREATMENT OF HALOHYDROCARBONS

Earl T. McBee, La Fayette, Ind., Vincent V. Lindgren, Cos Cob, Conn., and Waldo B. Ligett, Berkley, Mich., assignors to Purdue Research Foundation, La Fayette, Ind., a corporation of Indiana No Drawing. Application March 12, 1947, Serial No. 734,229

8 Claims. (Cl. 260—648)

This invention relates to a process for the preparation of fluorine-containing halohydrocarbons and halocarbons. More specifically, this invention pertains to the treatment of halohydrocarbons with bromine trifluoride.

The fluorinating agent in our invention, i. e., bromine trifluoride, has long been available to any investigator of fluorine chemistry. It may be prepared by passing elemental fluorine into bromine in a copper vessel or other container resistant to the action of the said reactants at a temperature of about ten degrees centigrade until no further quantity of fluorine is absorbed. No limiting difficulties are encountered in its preparation.

An undesirable and definitely limiting characteristic of this fuming liquid, however, is its excessive reactivity with most organic matter. The fact that this liquid reacts vigorously, when in contact with most organic material, has proven a tremendous obstacle to investigators of the field. Owing to the violent and explosive nature of most reactions between bromine trifluoride and organic matter, few successful experiments have been reported. Nutting (U. S. Patent 1,961,622, 1934 June 5) succeeded in reacting bromine trifluoride and carbon tetrachloride to produce fluorinated methanes, but excluding this bromine trifluoride treatment of monocarbon halocarbons, nothing has been known regarding the utility of bromine trifluoride as a fluorinating agent.

Considerable difficulty, not present in the treatment of carbon tetrachloride, is encountered in the fluorination of halohydrocarbons. Apparently because of the hydrogen present, fluorinating agents capable of reaction with monocarbon aliphatic halocarbons have proven themselves unadaptable to reactions with halohydrocarbons. One major obstacle in the satisfactory fluorination of polycarbon halohydrocarbons has been the concurrent fission of carbon-carbon linkages or "fluorinolysis." Thus, with elemental fluorine, the organic product obtained from a reaction with most halohydrocarbons consists almost entirely of carbon tetrafluoride and other fluorinated break-down products. The search for new and useful fluorinating agents, which have a less deteriorating effect upon the compound being fluorinated, has been extensively conducted.

Our invention thus concerns itself with a process whereby halohydrocarbons may be treated with bromine trifluoride, and whereby we may produce various organic compounds, in each instance containing more fluorine than the starting halohydrocarbon. A preferred embodiment of our invention is the employment of bromine trifluoride to produce fluorine-containing high molecular weight halohydrocarbons and halocarbons. An especial embodiment of our invention resides in the reaction of bromine trifluoride and a halohydrocarbon to produce high molecular weight fluorine-containing halohydrocarbons and halocarbons containing the same number of carbon atoms as the halohydrocarbon reacted in the process. The provision of a method whereby the above improvements may be accomplished is included among the objects of our invention.

We have also found that bromine trifluoride has exceptional utility in the following ways, all heretofore unreported:

(1) Bromine trifluoride adds fluorine to points of unsaturation in an unsaturated halohydrocarbon. Some bromine may also enter the molecule, for example, by addition to a double bond, but the possible addition of bromine is not to be considered an undesirable effect of the bromine trifluoride fluorination process. Thus, in the treatment of aromatic halohydrocarbons with bromine trifluoride, we have found any bromine which is introduced to be replaceable, with fluorine, by reaction with antimony pentafluoride, if such is desired.

(2) Bromine trifluoride may be used to replace, with fluorine, other halogen atoms in either an aromatic, alicyclic, or aliphatic halohydrocarbon. In this respect we have found that the presence of hydrogen has no prohibitive effect upon the replacement, with fluorine, of other halogen atoms in the molecule.

(3) Bromine trifluoride replaces, with fluorine, hydrogen in halohydrocarbons. In this respect bromine trifluoride has been found to have specific utility in the preparation of halocarbons, being in some instances capable of removing the last hydrogen atoms in a molecule without causing substantial fission of the molecule.

In view of the above disclosures, we include among the objects of our invention the provision of a process whereby: (1) bromine trifluoride may be used to add fluorine to points of unsaturation of an unsaturated halohydrocarbon; (2) bromine trifluoride may be used to replace, with fluorine, other halogen atoms in a halohydrocarbon; and, (3) bromine trifluoride may be used to replace, with fluorine, hydrogen atoms in a halohydrocarbon.

In some cases, new and useful halohydrocarbons and halocarbons are procured directly from the process. In other instances, the dehalogenation of cyclic halocarbons, prepared by the bromine trifluoride treatment of cyclic halohydrocarbons, may yield desirable aromatic or unsaturated cyclic fluorocarbons and fluorine-containing halocarbons. These compounds have particular utility as dielectrics, heat-transfer media, transformer fluids, insulating material, specific solvents, lubricants, and the like. Some of these compounds are also useful in the preparation of fluorine-containing synthetic resins. It is an additional object of the invention to provide a method for the production of new compounds, including chemical intermediates for the preparation of useful aromatic or otherwise unsaturated cyclic fluorocarbons and halocarbons. Other objects of the invention will become apparent hereinafter.

The present invention essentially comprises the treatment of a halohydrocarbon with bromine trifluoride at a temperature between about zero degrees and about 175 degrees centigrade, preferably within the lower temperature ranges. The reaction is preferably carried out by admixing the reactants at a relatively low temperature, e. g., between zero and sixty degrees centigrade, and thereafter heating the reaction mixture to a relatively higher temperature, e. g., sixty to 200 degrees centigrade. The pressure under which the reaction is conducted may be subatmospheric, atmospheric, or superatmospheric.

While the present invention, in its broader sense, is applicable to any halohydrocarbon, a preferred method of operation under the invention involves its application to a hydrocarbon having at least about one-fourth of its original hydrogen atoms replaced with halogen atoms. The halogen atoms may be bromine, chlorine, fluorine, or iodine, or combinations of several or all members of the class. The process herein disclosed is moreover of still greater efficiency when applied to a hydrocarbon having one-half or more of its original hydrogen atoms replaced by halogen atoms. These halogenated compounds usually allow a more easily controllable reaction, and the obviation of excessively tedious reaction procedure lends pronounced advantages to this preferred embodiment over the same process when employed with halohydrocarbons having a lesser halogen content.

In the practice of our invention, the halohydrocarbon and bromine trifluoride may be contacted in any suitable manner. Thus, we may place the halohydrocarbon in a suitable reaction container and add the bromine trifluoride thereto. It is sometimes more advantageous to apply the reverse procedure, adding the halohydrocarbon to bromine trifluoride. Occasionally, it is of assistance to employ a liquid medium for the reaction, e. g., liquid bromine, although the halohydrocarbon or mixture of halohydrocarbons and bromine trifluoride may be reacted directly.

After the reactants have been admixed, with suitable precautions as outlined below, the mixture is heated to a higher temperature, e. g., room temperature to about 175 degrees centigrade, and maintained at this temperature for a considerable interval, for example, three to thirty hours. Any excess bromine trifluoride may then be destroyed by the addition of a suitable agent, e. g., cracked ice, cold water, sodium bicarbonate, et cetera, and the resulting fluorine-containing organic compound washed with aqueous alkali, dissolved in a suitable solvent, dried, and the product recovered.

Although the above conditions represent the optimum for our process, temperature ranges of considerably wider scope have been employed with success, e. g., the reaction proceeds satisfactorily between zero and 200 degrees centigrade, preferably between zero and 175 degrees centigrade, with slightly more decomposition at the upper temperature levels.

A primary consideration in carrying out the process, regardless of the procedure according to which the reactants are contacted, is the prevention of accumulation of unreacted starting material. For this reason we employ constant agitation of the reaction mixture and introduce the one reactant, which is selected for addition, in a portionwise manner, especially during the early stages of the reaction. For this reason, also, we find that cooling of the reaction mixture to low temperatures, e. g., zero degrees centigrade, and subsequent heating of the reaction at a higher temperature, e. g., 100 degrees centigrade, before and after each addition, respectively, is sometimes of particular advantage in causing the reactant in each addition, especially the first additions, to react completely with the other reactant, thus circumventing undesirable accumulation with its contingent pyrolysis or explosion. After the reaction has proceeded for some time, it is usually permissible to increase the rate of addition of reactants because of the diluent effect of the bromine and the fluorinated product. The reaction may also sometimes be advantageously conducted in the presence of one or more of the products of the reaction, which in such instances serve as a diluent. However, in no case was omission of the above precautions found advisable, either for the procurement of satisfactory products or maximum safety of the operator.

The reaction vessel may be a nickel tube of considerable diameter and appreciable length, for example 5.2 and 50 centimeters, respectively, sealed at one end. Such a tube, or one similar, proved satisfactory in conducting many of the illustrative examples herein. The means of agitation was, in most cases, a propeller-stirrer, consisting of a motor-driven nickel rod with four nickel blades appended thereto, which was inserted through the top of the tube. It was also found advantageous not to seal the tube at the top, in the event unexpected violence manifested itself during the reaction.

The following examples are given to illustrate the practice of our invention, but are in no way to be construed as limiting.

*Example 1.—Benzotrifluoride*

Benzotrifluoride (10 milliliters) was placed in a small nickel tube closed at one end and cooled to zero degrees centigrade. Bromine trifluoride was added slowly to the nickel reaction tube, with constant stirring. After each addition of bromine trifluoride, the reaction mixture was heated to 90 degrees centigrade, maintained at this temperature for two hours, and cooled to zero degrees centigrade. Seventy-six grams of benzotrifluoride and 175 grams of bromine trifluoride were added in a portionwise manner to the quantities originally reacted, with constant agitation. The reaction was then heated at 90 degrees centigrade overnight. When washed with sodium bicarbonate, the organic product separated into two layers, one of which became solid as excess bromine was expelled. This solid product was dissolved in hot alcohol, and water was added to the solution to cause its precipitation therefrom. After standing for eight hours, a yellow liquid was separated, washed twice with water, and dried over Drierite. The product weighed 160 grams and contained, by analysis, 27.3 per cent fluorine and 24.3 per cent other halogen.

Example 2.—Hexafluoroxylene

Twenty-eight grams of hexafluoroxylene was placed in a nickel tube, cooled to zero degrees centigrade, and bromine trifluoride added dropwise thereto with constant agitation. A considerable excess of bromine trifluoride was used in the treatment. After preliminary heating of the mixture at 90 degrees centigrade for about one hour after each major quantity of bromine trifluoride had been added, and subsequent cooling to zero degrees centigrade, the reaction was heated to 110 degrees centigrade. Twenty hours were allowed for complete reaction of the ingredients at this temperature, and the organic product was then washed with water after the excess bromine trifluoride was destroyed with dilute sodium bicarbonate solution. Fifty-one grams of a very viscous liquid, having an approximate density of 2.5, was separated. Analysis of the product showed it to be a halodimethylcyclohexane and to contain 30.13 per cent fluorine and 39.69 per cent other halogen.

The above 51 grams of fluorine-containing product was further reacted with bromine trifluoride. A similar procedure was employed, the reaction being carried out at a higher temperature and an additional 25 grams of bromine trifluoride being used in the treatment. The reaction was discontinued after 15 hours at 165 degrees centigrade and the reaction product was treated for purification purposes as above. A colorless liquid weighing 45.5 grams resulted, the analysis of which indicated it to be a mixture of halodimethylcyclohexanes with a fluorine content of 41.6 per cent and other halogen content of 25.7 per cent.

Example 3.—Nonafluoromesitylene

Thirteen grams of nonafluoromesitylene was added to a nickel container and cooled to zero degrees centigrade. In a dropwise manner, 33 grams of bromine trifluoride was added to the halohydrocarbon with constant stirring. The reaction mixture was heated to 100 degrees centigrade and maintained at this temperature for twelve hours. After destroying excess bromine trifluoride with dilute sodium bicarbonate, extracting with hot alcohol, washing, and drying over Drierite, a very viscous liquid was obtained. This organic product contained 46.9 per cent fluorine and 18.5 per cent other halogen.

Example 4.—Trichlorobis(trifluoromethyl) benzene)

One hundred and thirty-five grams of trichlorobis(trifluoromethyl)benzene was placed in a nickel tube, 5.2 centimeters in diameter and 50 centimeters in length, cooled to ice temperature, and 233 grams of bromine trifluoride was added thereto over a period of four hours. The tube was heated to 100 degrees centigrade after the addition of each major portion of bromine trifluoride and returned to zero after reaction was complete, as evidenced by no further evolution of bromine fumes from the reaction mixture. When all the reactants had been added, the tube was heated at 100 degrees centigrade for three hours, at the end of which time excess bromine trifluoride was destroyed with water. The product was then washed with dilute alkali and water. Two hundred grams of organic material was separated and found to be a mixture of partially halogenated bis(trifluoromethyl)cyclohexanes and perhalobis(trifluoromethyl) cyclohexanes, containing 41.9 per cent fluorine and 24.1 per cent other halogen.

Example 5.—Halowax

Halowax, a mixture of penta- and hexachloronaphthalenes, was recrystallized from a carbon tetrachloride-methanol solution and treated in a manner similar to that of Example 4. Six hundred and fifteen grams (4.5 moles) of bromine trifluoride was placed in the nickel tube described in Example 4, cooled to ice temperature, and the purified Halowax added thereto with continuous stirring. The Halowax was added slowly in a portionwise manner over a four-hour period, the reaction mixture being maintained at a low temperature throughout the addition. When all of the halohydrocarbon had been added, the reaction was heated at 95 degrees centigrade for three hours and then at 150 degrees centigrade for three hours. After being cooled to 40 degrees centigrade, the product was still liquid and contained excess bromine trifluoride. The excess bromine trifluoride was destroyed and the organic product washed with dilute alkali and water. Halogen analysis showed 19.6 per cent bromine, 27.8 per cent chlorine, and 30.8 per cent fluorine, which evidenced that the product was a mixture of average composition $C_{10}Br_3Cl_5F_{11}$.

Example 6.—Nonachloroheptane

A chlorinated heptane, $C_7Cl_9H_7$, was reacted with bromine trifluoride in the manner above-described for Halowax. One hundred ninety-four grams of the nonachloroheptane was treated with 264 grams of bromine trifluoride and heated at 160 degrees centigrade for six hours. The organic product was obtained by washing with dilute alkali and water, and drying over Drierite. This product weighed 162 grams and was a mixture of heptanes containing 29.8 per cent fluorine and 52.6 per cent halogen other than fluorine.

Example 7.—Pentachloroheptane

Pentachloroheptane was treated with bromine trifluoride as previously described for other halohydrocarbons. One hundred sixty grams of pentachloroheptane and 226 grams of bromine trifluoride were used in the process, the heptane being added to bromine trifluoride in a nickel tube. The reaction was heated at 155 degrees centigrade for twelve hours, the excess bromine trifluoride destroyed, and the organic product worked up as in previous examples. The product weighed 143 grams and was a colorless liquid, a mixture of heptanes containing 46.3 per cent fluorine and 32.1 per cent other halogen.

Example 8.—Polychloroheptanes

Thirty-five grams of chlorinated heptane, containing 12 to 13 chlorine atoms per molecule, was reacted with 0.5 mole of bromine trifluoride after the fashion of Example 1. After all the chlorinated heptane had been added, the reaction mixture was heated at 90 degrees overnight. At the end of this time, the organic layer was washed free of bromine and dried over Drierite. The very viscous liquid which resulted was a mixture of halogenated heptanes and contained bromine, chlorine, and fluorine.

This bromochlorofluoroheptane was treated again with bromine trifluoride. The mixture was heated between 115 and 120 degrees centigrade for thirty hours. The resulting organic product was washed free of bromine. Analyses showed the product to contain 34.0 per cent fluorine and 48.9 per cent halogen other than fluorine, with little or no bromine present. This corresponds approximately to $C_7Cl_7F_3$, which has 48.7 per cent chlorine and 34.0 per cent fluorine.

Other halohydrocarbons which may be treated in the process with bromine trifluoride include trichloroethane, tetrachloroethane, pentachloroethane, dichloroethylene, trichloroethylene, tetrachloropropane, pentachloropropane, hexachloropropane, heptachloropropane, tetrachloropropene, pentachloropropene, pentachlorobutane, hexachlorobutane, heptachlorobutane, octachlorobutane, tetrachlorobutene, pentachlorobutene, hexachlorobutene, heptachlorobutene, pentachlorobutadiene, tetrachloroisobutene, pentachloroisobutane, pentachloropentane, tetrachloropentene, hexachloroisopentane, hexachlorohexane, octachlorohexene, decachlorooctane, other similar aliphatic halohydrocarbons; dichlorocyclohexene, polychlorocyclohexanes, bromochlorocyclohexanes, chlorobenzene, trifluorobenzene, pentachlorobenzene, dichlorohexafluoroxylene, chlorononafluoromesitylene, hexachloromethylnaphthalene, and other similar polychlorinated saturated or unsaturated ring halohydrocarbons, including mono- or polyalkyl-substituted derivatives thereof.

It is to be understood that the treatment of unsaturated halohydrocarbons with bromine trifluoride may be allowed to proceed to any desired extent. In many cases in a reaction of bromine trifluoride and an unsaturated halohydrocarbon, the addition of fluorine, and possibly some bromine, to the points of unsaturation is the first step to occur, with substitution being effected secondarily. As this is the case, a saturated fluorine-containing halohydrocarbon is thus the first product of such an unsaturated halohydrocarbon-bromine trifluoride reaction. The saturated fluorine-containing halohydrocarbon, after being separated from the reaction mixture, may then be further reacted with bromine trifluoride, yielding a compound having a still greater fluorine content.

The ratio of fluorine to other halogen in the product will be found to vary with the type of starting material and the halogen content of the halohydrocarbon reacted in the process. For example, the product from the bromine trifluoride treatment of a chlorine-containing halohydrocarbon may contain fluorine and chlorine, and possibly some bromine. Thus, according to the nature of the reactant, and depending upon the time and temperature employed, the amount of fluorine introduced into the molecule may be varied considerably.

Modifications may be made in carrying out the method of our invention, and it is to be understood that we limit ourselves only as defined in the appended claims.

We claim:

1. The process for the simultaneous introduction of fluorine and bromine into an unsaturated halohydrocarbon which includes the step of mixing an unsaturated halohydrocarbon with bromine trifluoride, maintaining the reaction at a temperature between about zero degrees and about 200 degrees centigrade, and separating from the reaction product a more highly saturated organic compound having an increased fluorine and bromine content, and having the same number of carbon atoms as the starting halohydrocarbon.

2. The process of claim 1, wherein the temperature is maintained below about 150 degrees centigrade.

3. The process of claim 1, wherein the halohydrocarbon and bromine trifluoride are admixed at a temperature below about room temperature, and thereafter heated in admixture with agitation at a temperature below about 200 degrees centigrade.

4. The process of claim 1, wherein the starting unsaturated halohydrocarbon is a hydrocarbon having at least one-fourth of its original hydrogen atoms replaced by halogen.

5. The process of claim 1, wherein the starting unsaturated halohydrocarbon is an unsaturated cyclic halohydrocarbon.

6. The process of claim 1, wherein the starting unsaturated halohydrocarbon is a (trifluoromethyl) benzene.

7. The process of claim 1, wherein the starting unsaturated halohydrocarbon is a tris(trifluoromethyl) benzene.

8. The process of claim 1, wherein the starting unsaturated halohydrocarbon is a bis(trifluoromethyl) benzene.

EARL T. McBEE.
VINCENT V. LINDGREN.
WALDO B. LIGETT.

REFERENCES CITED

The following references are of record in the file of this patent:

Miller, J. A. C. S., 62, 341–4 (1940).
Lebeau, Ann. Chim. Phys., 9, 241–61 (1906).